(12) United States Patent
Luong et al.

(10) Patent No.: US 9,154,241 B2
(45) Date of Patent: Oct. 6, 2015

(54) METHOD FOR VALIDATING RADIO-FREQUENCY PERFORMANCE OF WIRELESS ELECTRONIC DEVICES

(71) Applicant: Apple Inc., Cupertino, CA (US)

(72) Inventors: Anh Luong, Santa Clara, CA (US); Aristoteles D. Pritsopoulos, San Jose, CA (US)

(73) Assignee: Apple Inc., Cupertino, CA (US)

( * ) Notice: Subject to any disclaimer, the term of this patent is extended or adjusted under 35 U.S.C. 154(b) by 304 days.

(21) Appl. No.: 13/675,920

(22) Filed: Nov. 13, 2012

(65) Prior Publication Data

US 2014/0133321 A1    May 15, 2014

(51) Int. Cl.
*H04B 17/00*    (2015.01)
*H04B 17/10*    (2015.01)
*H04B 17/16*    (2015.01)

(52) U.S. Cl.
CPC .......... *H04B 17/0037* (2013.01); *H04B 17/104* (2015.01); *H04B 17/16* (2015.01)

(58) Field of Classification Search
None
See application file for complete search history.

(56) References Cited

U.S. PATENT DOCUMENTS

| 2004/0176058 | A1* | 9/2004 | Johnson ........................ 455/147 |
|---|---|---|---|
| 2011/0274092 | A1 | 11/2011 | Liu et al. |
| 2011/0286346 | A1 | 11/2011 | Barbieri et al. |
| 2012/0028663 | A1 | 2/2012 | Nejatian et al. |
| 2012/0213116 | A1 | 8/2012 | Koo et al. |
| 2013/0021962 | A1* | 1/2013 | Hu et al. ....................... 370/315 |

OTHER PUBLICATIONS

Rohde and Schwarz—Measurement of Harmonics using Spectrum Analyzers. Mar. 2012.*
Roessler et al., "LTE UE RF Measurements—An Introduction and Overview," Rhode and Schwarz, Germany, Feb. 2010 (28 pages).

* cited by examiner

*Primary Examiner* — Ayaz Sheikh
*Assistant Examiner* — Tarell Hampton
(74) *Attorney, Agent, or Firm* — Treyz Law Group; Michael H. Lyons (57) ABSTRACT

A test system for testing a wireless electronic device is provided. The test system may include a test host and a tester. The test host may instruct the electronic device under test (DUT) to transmit radio-frequency test signals in a selected resource block of a desired channel identified by a channel number in the Long Term Evolution frequency band. The tester may measure harmonic output power levels of the radio-frequency test signals transmitted by the DUT at harmonic frequencies of the selected resource block. The test host may compare the measured harmonic output power levels to threshold power levels to characterize the radio-frequency performance of wireless circuitry in the DUT. The test system may test the radio-frequency performance of the DUT for radio-frequency test signals transmitted by the DUT in some or all resource blocks in the desired Long Term Evolution band.

21 Claims, 8 Drawing Sheets

METHOD FOR VALIDATING RADIO-FREQUENCY PERFORMANCE OF WIRELESS ELECTRONIC DEVICES

BACKGROUND

This invention relates generally to electronic devices having wireless communications circuitry, and more particularly, to testing wireless communications circuitry in electronic devices.

Electronic devices such as portable computers and cellular telephones are often provided with wireless communications circuitry. The wireless communications circuitry is operable to transmit and receive radio-frequency signals. The wireless communications circuitry includes amplifier circuitry for amplifying the transmitted radio-frequency signals. The wireless communications circuitry wirelessly communicates using a communications protocol. The wireless communications circuitry transmits radio-frequency signals in a communications band associated with the communications protocol.

Electrical components in the wireless communications circuitry typically exhibit non-linearity. The non-linear electrical components produce undesired radio-frequency components at harmonic frequencies of the communications band (e.g., second order harmonics, third order harmonics, etc.). Undesired signal power at harmonic frequencies may interfere with other radio-frequency communications performed by the wireless communications circuitry.

Electronic devices can be subject to requirements such as regulatory requirements that restrict the amount of signal power produced at harmonic frequencies of a communications band. It can be challenging to design and manufacture electronic devices while ensuring that the electronic devices satisfy such requirements. For example, conventional test systems that test electronic devices can produce imprecise measurements. It would therefore be desirable to provide improved test systems for testing wireless communications circuitry.

SUMMARY

Electronic devices may include wireless communications circuitry. The wireless communications circuitry may include radio-frequency amplifier circuitry, radio-frequency transceiver circuitry, baseband circuitry, front-end circuitry, and antenna structures.

A test system may be used to test a wireless electronic device. The test system may include test equipment such as a test host and a tester. The wireless communications circuitry in the electronic device may accommodate communications in one or more frequency bands. Each operating band may contain a number of carrier frequencies identified by channel numbers such as Absolute Radio Frequency Channel Number (ARFCN). The carrier frequencies may be partitioned into a number of resource blocks. The test equipment may configure the wireless electronic device for communications in a selected frequency band. For example, the test equipment may configure the wireless electronic device to transmit radio-frequency signals in a Long Term Evolution (LTE) frequency band. The test equipment may configure the wireless electronic device for communications in a selected frequency channel identified by a channel number in the selected frequency band. Frequency channels in the selected frequency band that are identified by a channel number may sometimes be referred to as "channel numbers."

The test host may be configured to instruct the wireless electronic device to transmit radio-frequency signals in a selected resource block of the channel number in the frequency band. The tester may be configured to measure radio-frequency signal power levels produced by the wireless electronic device at selected harmonic frequencies of the selected resource block. The selected harmonic frequencies may include a second order harmonic frequency of the selected resource block, a third order harmonic frequency of the selected resource block, or any desired harmonic frequencies of the selected resource block.

The tester may include an antenna that wirelessly receives the radio-frequency signals transmitted by the electronic device. If desired, the radio-frequency signals may be received over a radio-frequency cable coupled between a connector at the tester and the wireless electronic device. The tester may be configured to provide measured radio-frequency signal power levels to the test host. The test host may be configured to perform pass-fail test operations by determining whether the radio-frequency signal power levels exceed predetermined threshold power levels. In response to determining that the radio-frequency power levels exceed the predetermined threshold power levels, the test equipment may notify a user that wireless communications circuitry in the wireless electronic device fails testing.

Each resource block in each channel number in the frequency band may correspond to a respective set of frequency subcarriers and a respective time period. The test equipment may measure the radio-frequency power levels produced by the wireless communications circuitry at harmonic frequencies of the set of frequency subcarriers.

The test equipment may instruct the wireless electronic device to transmit radio-frequency signals in an additional resource block of the channel number in the frequency band. The test equipment may measure radio-frequency signal power levels transmitted by the wireless electronic device at selected harmonic frequencies of the additional resource block. The test equipment may instruct the wireless electronic device to transmit the radio-frequency signals in the selected resource block during a first time period and the test equipment may instruct the wireless electronic device to transmit the radio-frequency signals in the additional resource block during a second time period subsequent to the first time period. Similar steps may be performed to test radio-frequency performance in other resource blocks of the channel number in the frequency band and to test radio-frequency performance in resource blocks of other channel numbers in the frequency band.

The test equipment may store data that identifies measured radio-frequency signal power levels for each tested resource block. Based on the stored data, the test equipment may determine whether the measured radio-frequency signal power levels exceed one or more predetermined thresholds. If desired, different threshold power levels may be defined for different resource blocks and/or harmonic frequencies. For example, the test equipment may determine whether the measured radio-frequency signal power level at the second harmonic frequency of a selected resource block exceeds a first predetermined threshold and whether the measured radio-frequency signal power level at the third harmonic frequency of the selected resource block exceeds a second predetermined threshold.

The test equipment may provide a set of instructions to the wireless electronic device during test operations. Each instruction of the set may direct the wireless electronic device to transmit radio-frequency signals in a respective resource block of the resource blocks in the channel number in the frequency band. The test equipment may measure radio-frequency signal power levels transmitted by the wireless electronic device at selected harmonic frequencies of each resource block identified in the set of instructions. The test equipment may determine whether the measured radio-frequency signal power levels associated with each resource block of the set of instructions exceed a predetermined threshold power level. In response to determining that the measured radio-frequency signal power levels exceed the predetermined threshold power level, the test equipment may identify which resource blocks of the set of instructions have measured radio-frequency signal power levels that exceed the predetermined threshold power level.

The wireless electronic device may be operable to communicate in one or more additional frequency bands simultaneously with communications in the frequency band. The test equipment may identify harmonic frequencies of the selected resource block that are included in the additional frequency bands. If desired, the test equipment may perform test operations only at harmonic frequencies that potentially interfere with communications in the additional frequency bands.

Further features of the present invention, its nature and various advantages will be more apparent from the accompanying drawings and the following detailed description.

DETAILED DESCRIPTION

This relates generally to wireless communications, and more particularly, to systems and methods for testing wireless communications circuitry.

Electronic devices that include wireless communications circuitry may be portable electronic devices such as laptop computers or small portable computers of the type that are sometimes referred to as ultraportables. Portable electronic devices may also be somewhat smaller devices. The wireless electronic devices may be, for example, cellular telephones, media players with wireless communications capabilities, handheld computers (also sometimes called personal digital assistants), remote controllers, global positioning system (GPS) devices, tablet computers, and handheld gaming devices. Wireless electronic devices such as these may perform multiple functions. For example, a cellular telephone may include media player functionality and may have the ability to run games, email applications, web browsing applications, and other software.

Figure 1:
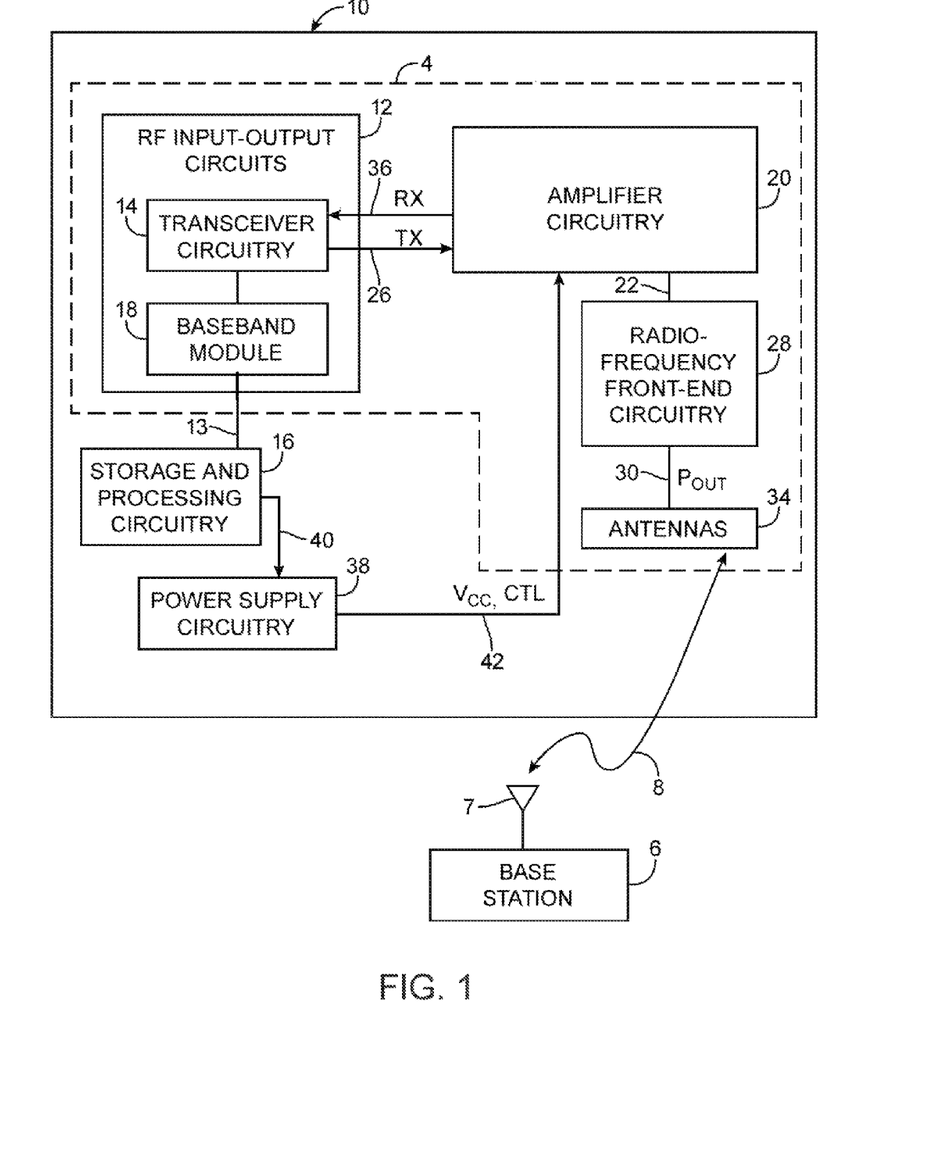
FIG. 1 is a diagram of an illustrative electronic device with wireless communications circuitry that may be used to communicate with a base station in accordance with an embodiment of the present invention.

FIG. 1 shows an illustrative electronic device that includes wireless communications circuitry. As shown in FIG. 1, wireless communications circuitry 4 in device 10 may communicate with a base station 6 over a wireless communications link 8. Wireless communications link 8 may be established between base station 6 and wireless communications circuitry 4 and may serve as a data connection over which device 10 may send data to and receive data from base station 6. Communications link 8 may be established and maintained using cellular telephone network standards such as the Long Term Evolution (LTE) protocol (as an example).

Wireless communications circuitry 4 may include one or more antennas such as antenna structures 34 and may include radio-frequency (RF) input-output circuits 12. During signal transmission operations, circuitry 12 may supply radio-frequency signals that are transmitted by antennas 34. During signal reception operations, circuitry 12 may accept radio-frequency signals that have been received by antennas 34.

Wireless communications circuitry 4 of device 10 may support communications over any suitable wireless communications bands. For example, wireless communications circuitry 4 may be used to cover communications frequency bands such as cellular telephone voice and data bands at 850 MHz, 900 MHz, 1800 MHz, 1900 MHz, and the communications band at 2100 MHz band, the Wi-Fi® (IEEE 802.11) bands at 2.4 GHz and 5.0 GHz (also sometimes referred to as wireless local area network or WLAN bands), the Bluetooth® band at 2.4 GHz, the global positioning system (GPS) band at 1575 MHz, and the Global Navigation Satellite System (GLONASS) band at 1602 MHz. The wireless communications bands used by device 10 may include the so-called LTE (Long Term Evolution) bands. The LTE bands are numbered (e.g., 1, 2, 3, 4, etc.) and are sometimes referred to as E-UTRA operating bands. Each LTE band may be partitioned into subsets of frequencies that are sometimes referred to as channel numbers.

Device 10 may be used to cover these communications bands and other suitable communications bands with proper configuration of antenna structures 34 in wireless communications circuitry 4. Any suitable antenna structures may be used in device 10. For example, device 10 may have one antenna or may have multiple antennas. The antennas in device 10 may each be used to cover a single communications band or each antenna may cover multiple communications bands. If desired, one or more antennas may cover a single band while one or more additional antennas are each used to cover multiple bands. Device 10 may transmit and receive radio-frequency signals in a number of communications bands simultaneously.

Device 10 may include storage and processing circuitry such as storage and processing circuitry 16. Storage and processing circuitry 16 may include one or more different types of storage such as hard disk drive storage, nonvolatile memory (e.g., flash memory or other electrically-programmable-read-only memory), volatile memory (e.g., static or dynamic random-access-memory), etc. Storage and processing circuitry 16 may be used in controlling the operation of device 10. Processing circuitry in circuitry 16 may be based on processors such as microprocessors, microcontrollers, digital signal processors, dedicated processing circuits, power management circuits, audio and video chips, radio-frequency transceiver processing circuits, radio-frequency integrated circuits of the type that are sometimes referred to as baseband modules, and other suitable integrated circuits.

Storage and processing circuitry 16 may be used in implementing suitable communications protocols (sometimes referred to as radio access technologies). Communications protocols that may be implemented using storage and processing circuitry 16 include internet protocols, wireless local area network protocols (e.g., IEEE 802.11 protocols—sometimes referred to as Wi-Fi®), protocols for other short-range wireless communications links such as the Bluetooth® protocol, protocols for handling 2G cellular telephone communications protocols such as GSM (Global System for Mobile Communications) and CDMA (Code Division Multiple Access), 3G cellular telephone communications protocols such as UMTS (Universal Mobile Telecommunications System) and EV-DO (Evolution-Data Optimized), 4G cellular telephone communications protocols such as LTE, etc. Communications using a selected communications protocol may be performed over an associated communications band (e.g., communications using the LTE communications protocol may be performed over an LTE band, etc.).

Data signals that are to be transmitted by device 10 may be provided to baseband module 18. Baseband processor 18 may receive signals from storage and processing circuitry 16 via path 13 to be transmitted over antenna 34. Baseband processor 18 may provide signals that are to be transmitted to transmitter circuitry within radio-frequency transceiver circuitry 14. The transmitter circuitry may be coupled to radio-frequency amplifier circuitry 20 via transmit path 26.

Path 13 may convey control signals from storage and processing circuitry 16 to input-output circuits 12. These control signals may be used to control the power of the radio-frequency signals that the transmitter circuitry within transceiver circuitry 14 supplies to amplifier circuitry 20. For example, the control signals may be provided to a variable gain amplifier located inside transceiver circuitry 14 that controls the power of the radio-frequency signals supplied to amplifier circuitry 20. The control signals may also be used to control the transmit frequency for radio-frequency signals provided to amplifier circuitry 20 over transmit path 26 (e.g., the control signals may instruct transceiver circuitry 14 to generate radio-frequency signals having a selected frequency for transmission). For example, the control signals may control transceiver circuitry 14 to communicate in one or more desired resource blocks within a selected channel identified by a channel number in a frequency band such as an LTE frequency band.

Amplifier circuitry 20 may include power amplifier circuitry, low noise amplifier circuitry, or any other desired circuitry for amplifying radio-frequency signals. Power amplifier circuitry in circuitry 20 may be coupled to transmit path 26. During data transmission, power amplifier circuitry in circuitry 20 may boost the output power of transmitted signals to a sufficiently high level to ensure adequate signal transmission. Amplifier circuitry 20 may include electrical components such as operational amplifiers, transistors, and any other desired components for amplifying signals. Amplifier circuitry 20 may supply signals for transmission to radio-frequency front-end circuitry 28 over line 22. Radio-frequency front-end circuitry 28 may include radio-frequency duplexer circuitry and other radio-frequency output stage circuitry such as radio-frequency switches and passive elements.

Wireless communications circuitry such as amplifier circuitry 20, radio-frequency front-end circuitry 28, and input-output circuits 12 may include non-linear components such as transistors, switches, and other non-linear components. Non-linear components that are present in radio-frequency signal paths may generate undesirable frequency harmonics. For example, transistors used in amplifier circuitry 20 or switches in radio-frequency front-end circuitry 28 may have non-linear properties that lead to the generation of second harmonics, third harmonics, and higher-order harmonics when passing radio-frequency signals.

Radio-frequency front-end circuitry 28 may include matching circuitry having a network of passive components such as resistors, inductors, and capacitors that ensure that antenna structures 34 are impedance matched to the rest of wireless communications circuitry 4. Wireless signals that are received by antenna structures 34 may be conveyed to amplifier circuitry 20 via path 30, front-end circuitry 28, and path 22. Wireless signals that are received by antennas 34 may be amplified by low noise amplifier circuitry in circuitry 20. The low noise amplifier circuitry in circuitry 20 may be coupled to a receive path such as receive path 36. Received wireless signals may be subsequently passed to receiver circuitry in transceiver circuitry 14 over receive path 36.

Device 10 may include adjustable power supply circuitry such as power supply circuitry 38. Adjustable power supply circuitry 38 may be controlled by control signals received over control path 40. The control signals may be provided to adjustable power supply circuitry 38 from storage and processing circuitry 16 or any other suitable control circuitry (e.g., circuitry implemented in baseband module 18, circuitry in transceiver circuits 14, etc.). Power supply circuitry 38 may supply control signals CTL to amplifier circuitry 20 over path 42. For example, power supply circuitry 38 may supply control signals CTL to amplifier circuitry 20 that instruct amplifier circuitry 20 to operate in a low gain mode or a high gain mode. Power supply circuitry 38 may also supply bias voltages $V_{CC}$ to amplifier circuitry 20 over path 42.

Figure 2:
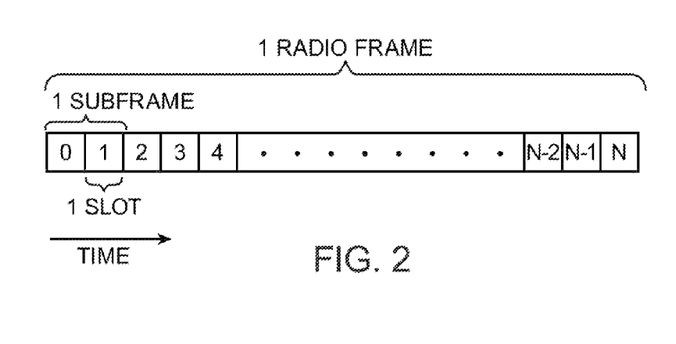
FIG. 2 is a diagram of an illustrative radio frame that may be transmitted by wireless communications circuitry during testing in accordance with an embodiment of the present invention.

Radio-frequency signals transmitted by the wireless communications circuitry 4 operating in accordance with the LTE protocol may, for example, be organized in time to form a radio frame structure that is illustrated in FIG. 2. As shown in FIG. 2, a radio frame may be partitioned into subframes, each of which can be divided into two time slots (e.g., each radio frame may include N time slots). As an example, the radio frame may include ten subframes, each of which includes two 0.5 ms time slots, totaling 20 time slots or 10 ms per radio frame. In general, each radio frame may include any number of subframes, each of which may include any suitable number of time slots having any desired duration.

The LTE communications protocol uses an Orthogonal Frequency-Division Multiplexing (OFDM) digital modulation scheme. The OFDM scheme is a type of frequency-division multiplexing scheme in which a large number of closely-spaced orthogonal subcarriers are used to carry data. Different variants of the OFDM scheme may be used for uplink signal transmission and downlink signal transmission, respectively. For example, downlink signals may be modulated using an Orthogonal Frequency Multiple Access (OFDMA) scheme and uplink signals may be modulated using a Single-Carrier Frequency Division Multiple Access (SC-FDMA) scheme. The closely-spaced orthogonal subcarriers may sometimes be referred to as frequency subcarriers, because each subcarrier may correspond to a range of frequencies. The data in each subcarrier may be modulated using respective digital modulation schemes such as quadrature phase shift keying (QPSK) and quadrature amplitude modulation (e.g., 16-QAM and 64-QAM).

Figure 3:
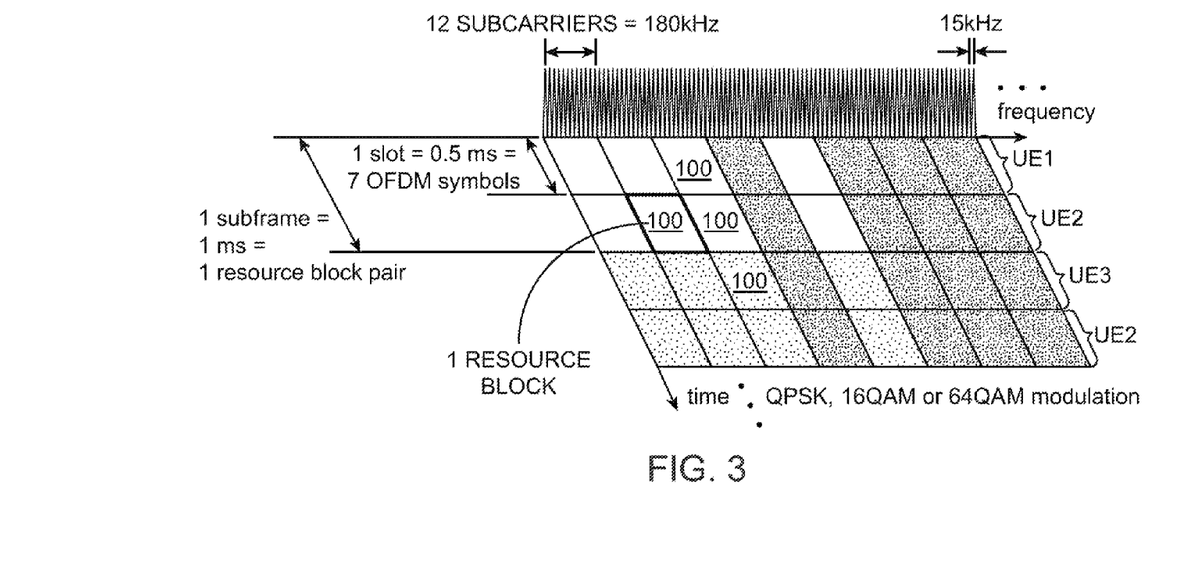
FIG. 3 is a diagram showing how wireless communications circuitry may transmit radio-frequency signals using the Orthogonal Frequency-Division Multiplexing (OFDM) scheme in accordance with an embodiment of the present invention.

As shown in FIG. 3, a designated user device may be given permission to transmit uplink signals during each time slot. For example, a first user device UE1 may transmit uplink signals to a corresponding base station during a first time period, a second user device UE2 may transmit uplink signals to the base station during a second time period, a third user device UE3 may transmit uplink signals to the base station during a third time period, etc. In another suitable arrangement, a base station may broadcast downlink signals intended for more than one user device during a given time slot (e.g., LTE may implement Orthogonal Frequency-Division Multiple Access for downlink transmission).

A wireless electronic device such as device 10 may transmit simultaneously in multiple resource blocks 100 during each time slot. Each time slot is partitioned in time into a number of OFDM symbols. A resource block may serve as a basic scheduling unit that is defined as a set of consecutive OFDM symbols in the time domain and a set of consecutive frequency subcarriers in the frequency domain. For example, a resource block such as resource block 100 may be defined as 7 consecutive OFDM symbols in the time domain and 12 consecutive frequency subcarriers in the frequency domain. The set of consecutive OFDM symbols used to define a resource block may depend on a parameter such as a normal or extended Cyclic Prefix. Each resource block 100 may, for example, measure 0.5 ms by 180 kHz (i.e., assuming a subcarrier spacing of 15 kHz).

Each LTE frequency band (e.g., LTE band 1, LTE band 2, etc.) may include an associated uplink band and an associated downlink band. As an example, LTE band 1 has an uplink band from 1920-1980 MHz and a downlink band from 2110-2170 MHz. As another example, LTE band 5 has an uplink band from 824-849 MHz and a downlink band from 869-894 MHz. During communications operations, a wireless electronic device such as device 10 may transmit radio-frequency signals in the uplink band associated with a selected LTE frequency band.

Device 10 may transmit radio-frequency signals over a range of frequencies within the selected uplink band (this range of frequencies in the uplink band may sometimes be referred to as an uplink channel having an associated channel bandwidth). For example, a device 10 that is configured to transmit radio-frequency signals using LTE band 1 may be configured to transmit signals in a channel centered at 1950 MHz with a channel bandwidth of 10 MHz (e.g., device 10 may transmit signals in a channel between frequencies 1945 MHz and 1955 MHz). In general, a device 10 that is configured to transmit signals using LTE band 1 may transmit signals in a channel centered at any frequency from 1920-1980 MHz given that the channel bandwidth does not include frequencies outside of the frequency range of LTE band 1.

Different LTE bands (e.g., LTE band 1, LTE band 2, etc.) may each require device 10 to transmit radio-frequency signals having selected channel bandwidths. For example, a device 10 that is configured to transmit radio-frequency signals in the uplink band of LTE band 1 may be required to transmit radio-frequency signals having a channel bandwidth of 5 MHz, 10 MHz, 15 MHz, or 20 MHz. In another example, a device 10 that is configured to transmit radio-frequency signals in the uplink band of LTE band 5 may be required to transmit radio-frequency signals having a channel bandwidth of 1.4 MHz, 3 MHz, 5 MHz, or 10 MHz. In general, each LTE band imposes respective requirements on the allowable channel bandwidth. Each channel in each LTE band may be identified by a respective channel number such as an Absolute Radio Frequency Channel Number (ARFCN) (i.e., each channel may be a numbered channel). Each numbered channel may sometimes be referred to as a "channel number."

Figure 4:
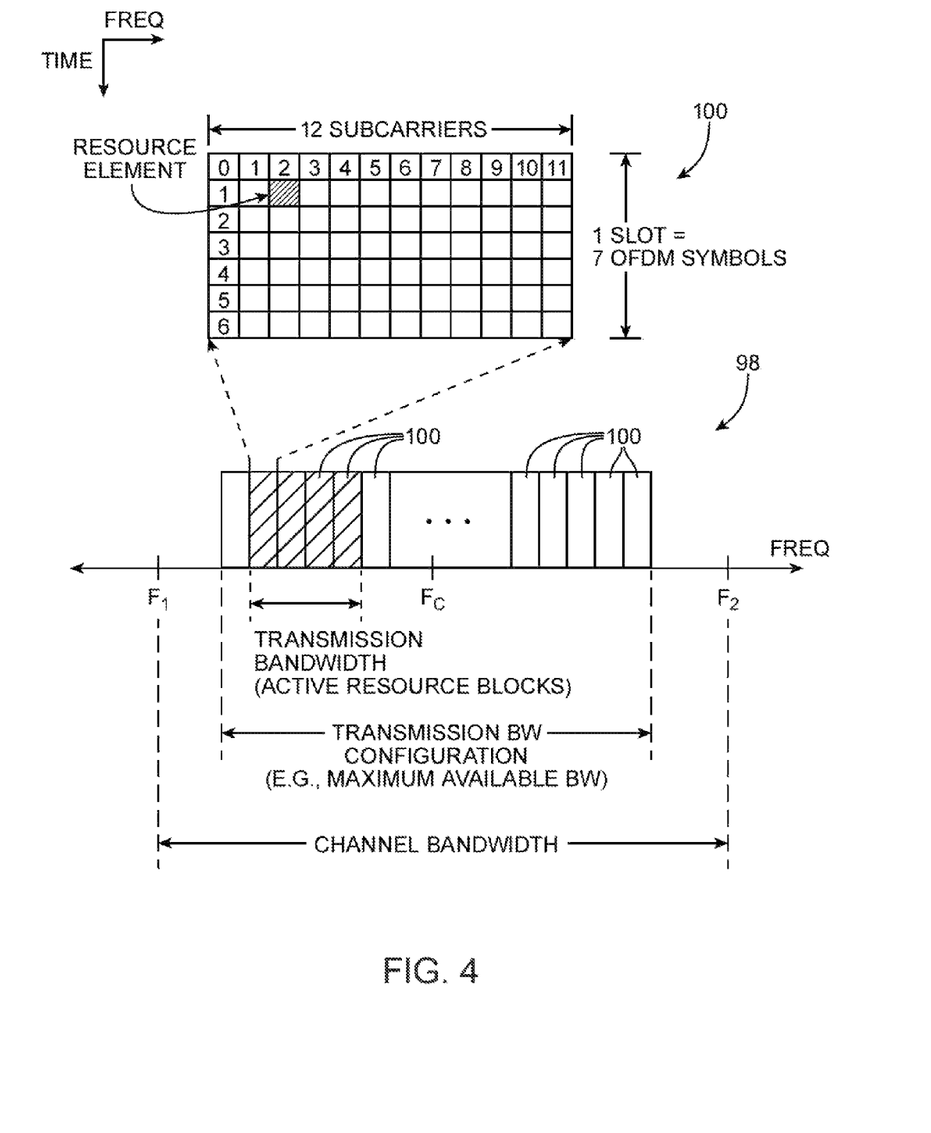
FIG. 4 is a diagram showing how wireless communications circuitry may communicate using one or more resource blocks of a radio-frequency channel during testing in accordance with an embodiment of the present invention.

FIG. 4 shows an illustrative channel 98 centered about frequency $F_C$. Channel 98 may be in the uplink band of any suitable LTE band. Channel 98 may have a lower channel edge bounded by frequency $F_1$ and a upper channel edge defined by frequency $F_2$ (e.g., channel 98 may have a channel bandwidth equal to $F_2$ minus $F_1$, where $F_C$ is equal to half of the sum of $F_2$ and $F_1$).

The maximum number of available resource blocks 100 associated with a particular channel may be defined as the transmission bandwidth configuration, which sets the maximum available (or occupied) bandwidth for transmission. The maximum available bandwidth may be computed by multiplying the transmission bandwidth configuration by 180 kHz (since each resource block has a bandwidth of 180 kHz in this example). The maximum available bandwidth is, by definition, less than or equal to the channel bandwidth. Generally, the number of resource blocks 100 making up the maximum available bandwidth increases as channel bandwidth increases.

As an example, a channel in the uplink band of a first LTE band may have a channel bandwidth of 10 MHz, a transmission bandwidth configuration of 50, and a maximum available bandwidth of 9 MHz (50*180 kHz). As another example, a channel in the uplink band of a second LTE band may have a channel bandwidth of 5 MHz, a transmission bandwidth configuration of 25, and a maximum available bandwidth of 4.5 MHz (25*180 kHz). As another example, a channel in the uplink band of a third LTE band may have a channel bandwidth of 3 MHz, a transmission bandwidth configuration of 15, and a maximum available bandwidth of 2.7 MHz (15*180 kHz). In general, channel 98 may have any suitable channel bandwidth (e.g., any suitable channel bandwidth allowed by the associated LTE band), a maximum available bandwidth that is less than or equal to the channel bandwidth and that is an integer multiple of the bandwidth of each resource block (e.g., an integer multiple of 180 kHz), and a transmission bandwidth configuration that is equal to the maximum available bandwidth divided by the resource block bandwidth.

As described previously in connection with FIG. 3, each resource block 100 may be formed with 12 consecutive subcarriers in the frequency domain, each of which is associated with 7 OFDM symbols in the time domain. The smallest modulation unit in LTE may be referred to as a resource element, which is defined as one 15 kHz subcarrier by one OFDM symbol. The time and frequency space spanned by one resource block 100 (e.g., 12 consecutive subcarriers by 6 or 7 consecutive OFDM symbols depending on whether the normal Cyclic Prefix or the extended Cyclic Prefix is currently in use) may be the smallest scheduling unit used by a user device such as device 10 to transmit radio-frequency signals.

Device 10 need not utilize all of its available resource blocks 100. Device 10 may be configured to transmit in only one resource block 100 or an allocated portion (subset) of its resource blocks 100. The number of active resource blocks that is allocated to device 10 may set its transmission bandwidth. The transmission bandwidth may, for example, be computed by multiplying the number of allocated (or active) resource blocks by the bandwidth of each resource block (e.g., 180 kHz). The transmission bandwidth is, by definition, less than or equal to the maximum available bandwidth (e.g., the number of active resource blocks cannot exceed the maximum number of available resource blocks). As an example, device 10 communicating in a channel having a channel bandwidth of 10 MHz and a transmission bandwidth configuration of 50 (e.g., a maximum available bandwidth of 9 MHz) may be configured to transmit radio-frequency signals in only 10% of its available resource blocks, only 20% of its available resource blocks, only 49% of its available resource blocks, etc. In the example of FIG. 4, the four active resource blocks 100 allocated to device 10 may be positioned relatively close to frequency $F_1$.

In general, the transmission bandwidth may be assigned to any desired portion of the maximum available bandwidth (e.g., the allocated resource blocks 100 for device 10 may be positioned near frequency $F_1$, near frequency $F_C$, near frequency $F_2$, or within any suitable subset of the maximum available bandwidth).

During transmission operations, wireless communications circuitry 4 in device 10 may transmit radio-frequency signals at one or more selected transmit frequencies in a desired LTE band. For example, device 10 may transmit radio-frequency signals in a selected resource block 100 in the uplink band associated with LTE band 1. Due to non-linearity exhibited by wireless circuitry 4, device 10 may transmit signals having radio-frequency components at frequencies outside of the desired LTE band, such as radio-frequency components at harmonics of the selected transmit frequency (e.g., second order harmonics, third order harmonics, etc.). Signal power transmitted by device 10 at harmonic frequencies of the selected transmit frequency may sometimes be referred to as harmonic output power, harmonic signal power, or spurious power.

The harmonic frequencies of a selected transmit frequency may be approximately equal to integer multiples of the selected transmit frequency. For example, a second order harmonic frequency may be equal to two times the selected transmit frequency, a third order harmonic frequency may be equal to three times the selected transmit frequency, a fourth order harmonic frequency may be equal to four times the selected transmit frequency, etc. Harmonic frequencies may be produced at integer multiples of a selected range of transmit frequencies (e.g., harmonic frequencies associated with frequencies of resource blocks 100 used for radio-frequency uplink communications).

When device 10 transmits radio-frequency signals in a first communications band (e.g., a cellular telephone voice and data band), harmonic output power may be generated in a second communications band that is also used by device (e.g., a Wi-Fi® band, GPS band, GLONASS band, etc.). Harmonic output power may cause interference with radio-frequency signals that are transmitted or received by device 10 in the second communications band. For example, device 10 may transmit radio-frequency signals at a selected transmit frequency of 825 MHz in LTE band 5. Non-linearity in amplifier circuitry 20 may cause harmonic output power to be transmitted at a third order harmonic frequency at 2475 MHz (3*825 MHz). Harmonic output power transmitted by device 10 at the third order harmonic frequency may, for example, interfere with wireless communications in the 2.4 GHz Wi-Fi® band (e.g., the harmonic output power produced by device 10 may interfere with transmission and reception of Wi-Fi® signals. In general, harmonic output power transmitted by device 10 may interfere with communication operations in any communications band (e.g., GPS, Bluetooth®, etc.).

Figure 5:
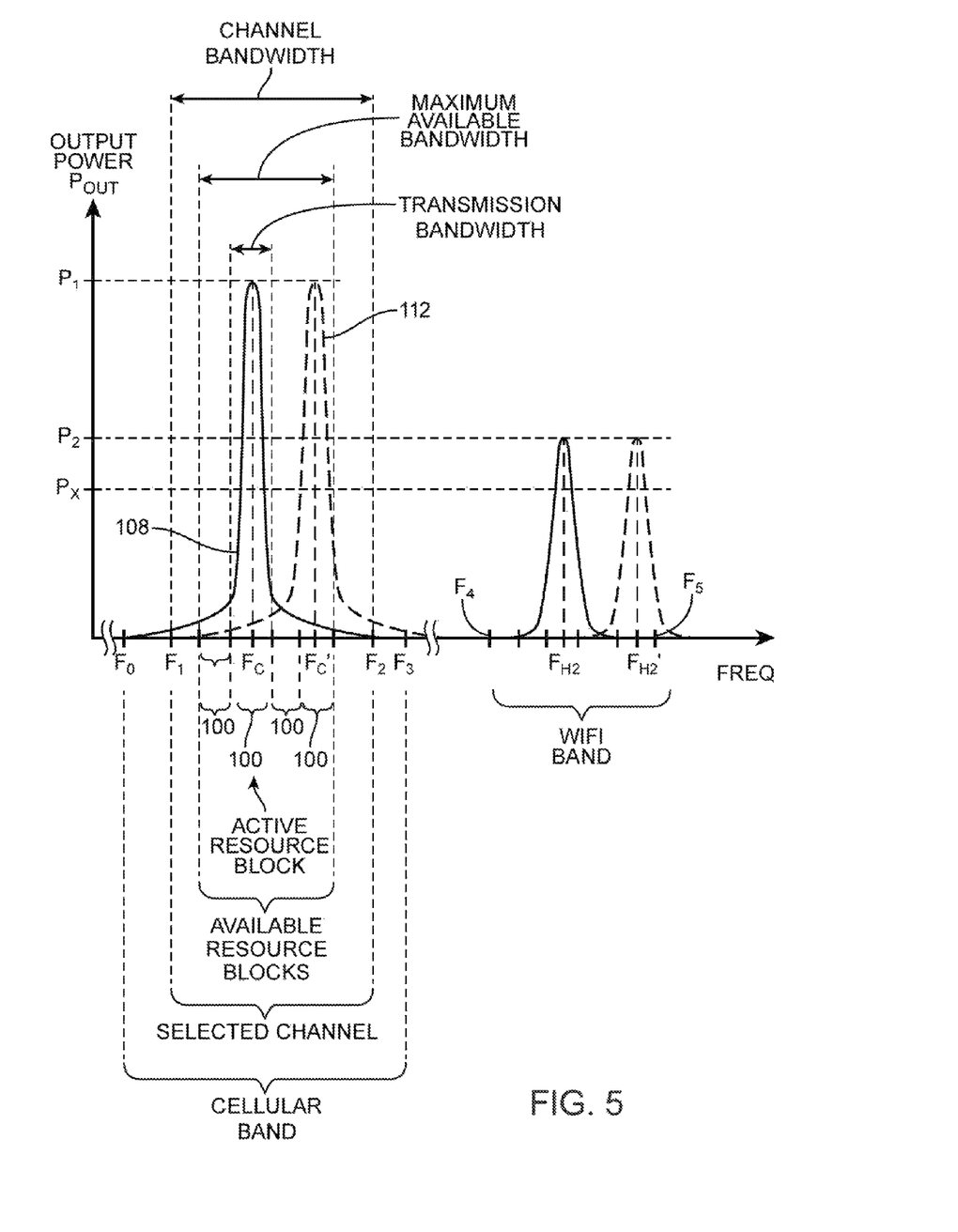
FIG. 5 is a graph showing how an electronic device that produces radio-frequency signals in a resource block of a channel identified by a channel number in a frequency band may produce harmonic signals that interfere with communications in other frequency bands in accordance with an embodiment of the present invention.

A graph showing how harmonic output power transmitted by device 10 in a first communications band may interfere with wireless operations in a second communications band is shown in FIG. 5. Curve 108 illustrates output power levels of device 10 (e.g., output power level $P_{out}$ produced via path 30 of front-end circuitry 28 of FIG. 1). In the example of FIG. 5, device 10 is configured to transmit radio-frequency signals in a cellular communications band between frequencies $F_0$ and $F_3$. The frequency range between frequencies $F_0$ and $F_3$ may be, for example, the uplink band associated with an LTE frequency band (e.g., LTE band 1, LTE band 2, etc.). Device 10 may transmit radio-frequency signals in a selected frequency channel between frequencies $F_1$ and $F_2$. In the example of FIG. 5, there are four available resource blocks 100 in the selected channel (i.e., the transmission bandwidth configuration associated with curve 108 is four). This example is merely illustrative. If desired, the selected frequency channel may include any desired number of resource blocks (e.g., 50 resource blocks, 10 resource blocks, etc.).

Device 10 may transmit radio-frequency signals in one or more active resource blocks 100 (e.g., resource blocks that have been assigned to device 10). In the example of FIG. 5, device 10 may have been assigned an active resource block 100 centered about frequency $F_C$. Device 10 may be configured to transmit signals at a desired output power level $P_1$. In the example of FIG. 5, the transmission bandwidth associated with curve 108 is the same as the bandwidth of active resource block 100, because device 10 is only transmitting radio-frequency signals in one resource block 100. In general, the transmission bandwidth may correspond to the number of active resource blocks.

Due to non-linear operation of wireless communications circuitry 4 in device 10, radio-frequency signals transmitted by device 10 may have a harmonic radio-frequency component at a second order harmonic frequency $F_{H2}$ that is approximately equal to two times frequency $F_C$. The radio-frequency signals transmitted by device 10 at second order harmonic frequency $F_{H2}$ may be produced at output power level $P_2$ (i.e., the transmitted radio-frequency signals may have harmonic output power level $P_2$ at second order harmonic frequency $F_{H2}$).

Curve 112 illustrates the output power level of device 10 when configured to transmit radio-frequency signals in a second resource block 100 centered about frequency $F_C'$. The radio-frequency signals corresponding to curve 112 may have a harmonic radio-frequency component at a second order harmonic frequency $F_{H2}'$ that is approximately equal to two times frequency $F_C'$. The radio-frequency signals associated with curve 112 may have harmonic output power level $P_2$ at second order harmonic frequency $F_{H2}'$. Device 10 may be configured to transmit radio-frequency signals corresponding to curve 108 during a first period of time and radio-frequency signals corresponding to curve 112 during a second period of time. Device 10 may transmit radio-frequency signals in any assigned resource block 100 of the available resource blocks in the selected channel.

As shown in FIG. 5, the harmonic output power at second order harmonic frequencies $F_{H2}$ and $F_{H2}'$ may interfere with radio-frequency signal transmission and reception by device 10 in other communications bands. Second order harmonic frequencies $F_{H2}$ and $F_{H2}'$ may lie in a communications band between frequencies $F_4$ and $F_5$. In the example of FIG. 5, the communications band between frequencies $F_4$ and $F_5$ is a Wi-Fi® band such as the 2.4 GHz Wi-Fi® band. Harmonic output power transmitted by device 10 at second order harmonic frequencies $F_{H2}$ and $F_{H2}'$ may interfere with radio-frequency transmission and reception by device 10 in the Wi-Fi® frequency band between frequencies $F_4$ and $F_5$.

FIG. 5 is merely illustrative. If desired, any desired number of resource blocks 100 may be used to transmit radio-frequency signals in the selected channel (e.g., the selected channel may have any desired channel bandwidth within the cellular communications band and the selected channel may be divided into any desired number of resource blocks). Radio-frequency signals may also be transmitted using any number and combination of resource blocks 100 in the selected channel (e.g., any number and combination of the available resource blocks 100 may be active). The communications band between frequencies $F_4$ and $F_5$ may be any suitable communications band such as a GPS frequency band, Bluetooth® frequency band, or any other frequency band over which device 10 transmits or receives radio-frequency signals. Harmonic output power produced by device 10 at any harmonic frequency (e.g., at a third order harmonic frequency, a fourth order harmonic frequency, etc.) may interfere with radio-frequency operations in other communications bands.

Figure 6:
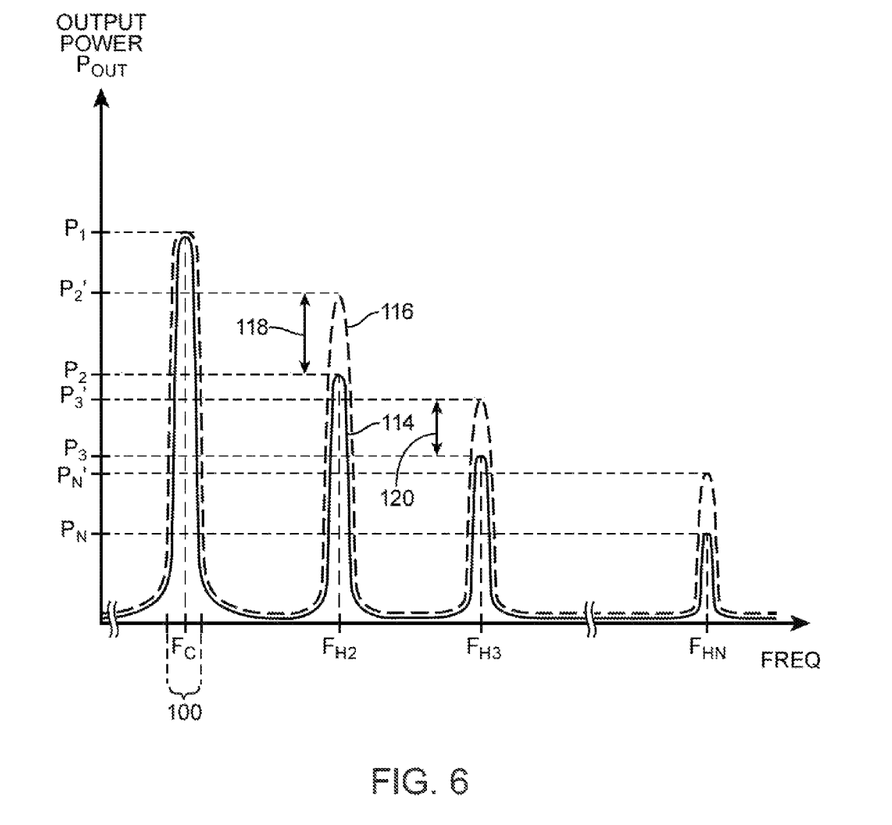
FIG. 6 is an illustrative graph showing how an electronic device that communicates in a resource block of a communications band may produce radio-frequency harmonics at multiple harmonic frequencies associated with the resource block in accordance with an embodiment of the present invention.

FIG. 6 is an illustrative graph showing how an electronic device that transmits radio-frequency signals in a resource block 100 may produce harmonic signals at multiple harmonic frequencies of the active resource block. The electronic device may, for example, be controlled to transmit the radio-frequency signals in resource block 100 during testing operations. Curve 114 illustrates the output power of device 10 across harmonic frequencies. In the example of FIG. 6, device 10 is configured to transmit radio-frequency signals in a resource block 100 centered about frequency $F_C$ (e.g., a frequency $F_C$ in a cellular communications band). Device 10 may be configured to transmit the radio-frequency signals at a desired output power level $P_1$. Device 10 may produce radio-frequency signals at N harmonic frequencies each at a respective harmonic output power level. For example, transmitted radio-frequency signals associated with curve 114 may include second order harmonics produced at frequency $F_{H2}$ with a harmonic output power level $P_2$, third order harmonics produced at frequency $F_{H3}$ with a harmonic output power level $P_3$, etc. Each harmonic frequency may be approximately equal to an integer multiple of frequency $F_C$.

Wireless electronic devices such as device 10 may be subject to manufacturing tolerances and other sources of device variance. Devices that are subject to excessive deviation from a desired design during manufacturing may produce unsatisfactory levels of harmonic output power levels (e.g., transistors that are designed for substantially linear operation may operate non-linearly and produce harmonic signals). During testing, acceptable threshold power levels for harmonic signals may be defined to help identify devices under test that produce excessive levels of harmonic output power.

Curve 116 shows how device 10 may produce excessive levels of harmonic signal power when configured to transmit radio-frequency signals at resource block 100 centered at frequency Fc at output power level $P_1$. As shown by curve 116, device 10 may produce radio-frequency signals at N harmonic frequencies each at a respective harmonic output power level. For example, radio-frequency signals associated with curve 116 may be transmitted at a second order harmonic frequency $F_{H2}$ at harmonic output power level $P_2'$, a third order harmonic frequency $F_{H3}$ at harmonic output power level $P_3'$, etc. Harmonic output power level $P_2'$ may be greater than harmonic output power level $P_2$ associated with curve 114 by a margin 118 and harmonic output power level $P_3'$ may be greater than magnitude $P_3$ associated with curve 114 by a margin 120. The transmitted radio-frequency signals associated with curve 116 have greater total harmonic output power than the radio-frequency signals represented by curve 114 (as an example).

The example of FIG. 6 in which device 10 produces power levels at higher order harmonics with decreasing magnitudes is merely illustrative. In some scenarios, harmonic output power levels associated with higher order harmonics may be greater than or equal to harmonic output power levels of lower order harmonics (e.g., harmonic output power level $P_3$ may be greater than or equal to harmonic output power level $P_2$, harmonic output power level $P_N$ may be greater than or equal to harmonic output power level $P_3$, etc.).

Harmonic output power transmitted by device 10 at any harmonic frequency (e.g., at one or more of harmonic frequencies $F_{H2}$, $F_{H3}$, $F_{HN}$, etc.) may interfere with radio-frequency operations in other communications bands used by device 10, such as the Wi-Fi® band between frequencies $F_4$ and $F_5$ as shown in FIG. 5. Excessive harmonic output power may cause an undesirable level of interference when transmitting and receiving radio-frequency signals in other communications bands with device 10. Harmonic output power levels $P_2$, $P_3$, and $P_N$ may be defined during radio-frequency testing as harmonic output power level thresholds (sometimes referred to as threshold harmonic output power levels). At harmonic output power levels exceeding these thresholds, an electronic device under test may be identified as producing unacceptable levels of interference with radio-frequency operations in other communications bands.

If desired, different resource blocks 100 may have different threshold harmonic output power levels. For example, a resource block centered about frequency $F_C$ may have a harmonic output power level $P_2$, whereas a resource block centered about frequency $F_C'$ may have a threshold harmonic output power level $P_x$ (FIG. 5) that is different from threshold harmonic output power level $P_2$. Threshold harmonic output power levels may be determined, for example, from carrier-imposed requirements, regulatory requirements, manufacturing requirements, design requirements, or any other suitable standards for the radio-frequency performance of device 10.

Curve 116 may represent transmitted radio-frequency signals having unacceptably high harmonic output power, because the output power levels $P_2'$ and $P_3'$ at harmonic frequencies $F_{H2}$ and $F_{H3}$ are greater than the corresponding harmonic power level thresholds $P_2$ and $P_3$. Wireless communications circuitry 4 that transmits radio-frequency signals associated with curve 116 may be identified as having unsatisfactory radio-frequency performance (e.g., wireless communications circuitry 4 may be identified as having excessive non-linearity).

Figure 7:
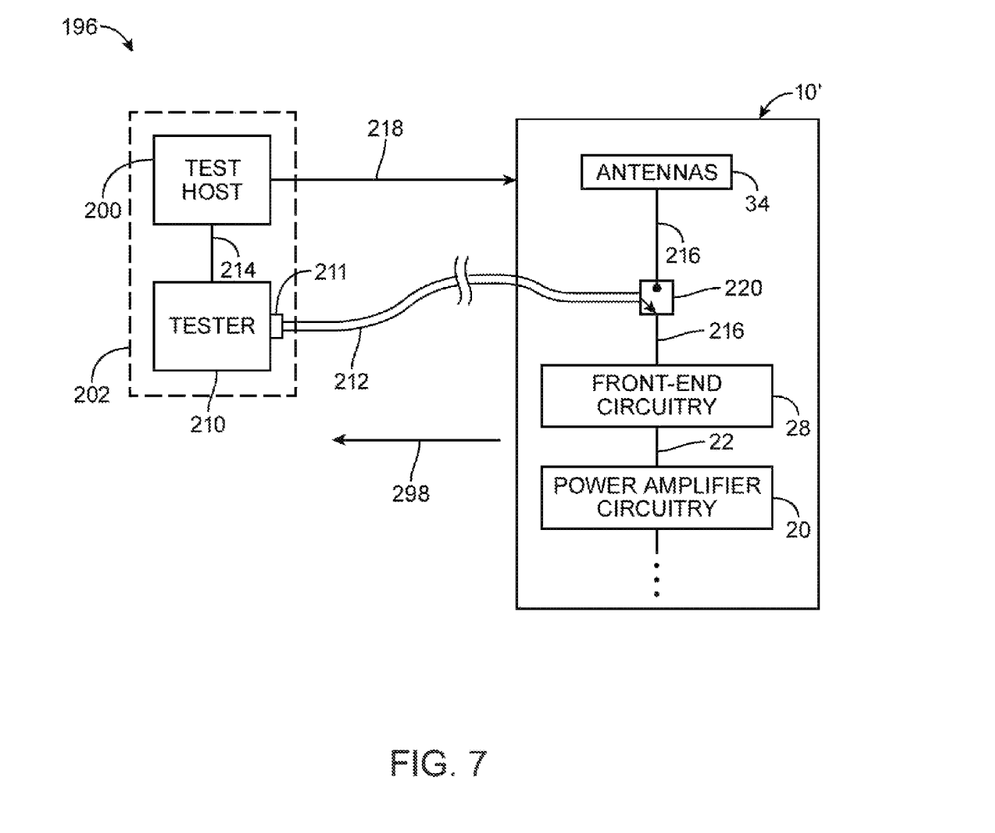
FIG. 7 is a diagram of an illustrative test system for testing a wireless electronic device using a wired connection in accordance with an embodiment of the present invention.

Testing systems such as test system 196 of FIG. 7 may be used to test the radio-frequency performance of wireless communications circuitry 4 in device 10. As shown in FIG. 7, test system 196 may include test host 200 (e.g., a personal computer, laptop computer, tablet computer, handheld computing device, etc.) and a testing unit such as tester 210. Test host 200 and/or tester 210 may include storage circuitry. Storage circuitry in test host 200 and tester 210 may include one or more different types of storage such as hard disk drive storage, nonvolatile memory (e.g., flash memory or other electrically-programmable-read-only memory), volatile memory (e.g., static or dynamic random-access-memory), etc. Wireless communications circuitry that is being tested using tester 210 and test host 200 may be referred to as device under test (DUT) 10'. DUT 10' may be, for example, a fully assembled electronic device such as electronic device 10 or a partially assembled electronic device (e.g., DUT 10' may include some or all of wireless circuitry 4 prior to completion of manufacturing). It may be desirable to test partially assembled electronic devices such as wireless communications circuitry 4 that have not yet been enclosed with an electronic device housing (e.g., for more convenient access by test equipment).

Tester 210 may include, for example, a radio communications analyzer, spectrum analyzer, power sensor, or any other components suitable for performing radio-frequency measurements on signals received from DUT 10'. Tester 210 may be operated directly or via computer control (e.g., when test unit 210 receives commands from test host 200). When operated directly, a user may control tester 210 by supplying commands directly to tester 210 using a user input interface of tester 210. For example, a user may press buttons in a control panel on tester 210 while viewing information that is displayed on a display in test unit 210. In computer controlled configurations, test host 200 (e.g., software running autonomously or semi-autonomously on test host 200) may communicate with tester 210 by sending and receiving control signals and data over path 214. Test host 200 and tester 210 may optionally be formed together as test equipment 202. Test equipment 202 may be a computer, test station, or other suitable system that performs the functions of test host 200 and tester 202 (e.g., the functionality of test host 200 and tester 210 may be implemented on one or more computers, test stations, etc.).

During test operations, DUT 10' may be coupled to test host 200 through wired path 218 (as an example). Connected in this way, test host 200 may send control signals over path 218 to instruct DUT 10' to perform desired operations during testing. Test host 200 and DUT 10' may be connected using a Universal Serial Bus (USB) cable, a Universal Asynchronous Receiver/Transmitter (UART) cable, or other types of cabling (e.g., bus 218 may be a USB-based connection, a UART-based connection, or other types of connections).

DUT 10' may be coupled to tester 210 through a radio-frequency cable such as radio-frequency test cable 212. DUT 10' may include a radio-frequency switch connector 220 interposed in a transmission line path 216 connecting radio-frequency front-end circuitry 28 to antenna structures (e.g., switch connector 220 may be interposed in path 30 as shown in FIG. 1). Test cable 212 may have a first terminal that is connected to a corresponding port in tester 210 via radio-frequency connector 211 and a second terminal that can be connected to switch connector 220. When mated with test cable 212, antenna structures 34 may be decoupled from front-end circuitry 28. At the same time, radio-frequency switch connector 220 may electrically connect front-end circuitry 28 and tester 210 via path 212. When cable 212 is coupled to DUT 10' via switch connector 220, tester 210 may be configured to perform testing (e.g., radio-frequency test signals may be conveyed from amplifier circuitry 20 to tester 210 via front-end circuitry 28, switch connector 220, and test cable 212). Cable 212 may include a miniature coaxial cable with a diameter of less than 2 mm (e.g., 0.81 mm, 1.13 mm, 1.32 mm, 1.37 mm, etc.), a standard coaxial cable with a diameter of about 2-5 mm, and/or other types of radio-frequency cabling.

Radio-frequency signals may be transmitted in an uplink direction (as indicated by arrow 298) from DUT 10' to tester 210 via test cable 212. During uplink signal transmission, DUT 10' may be configured to generate and transmit radio-frequency signals while tester 210 performs desired radio-frequency measurements on the received uplink signals. Radio-frequency signals transmitted from DUT 10' to tester 210 during testing operations may sometimes be referred to as radio-frequency test signals.

Figure 8:
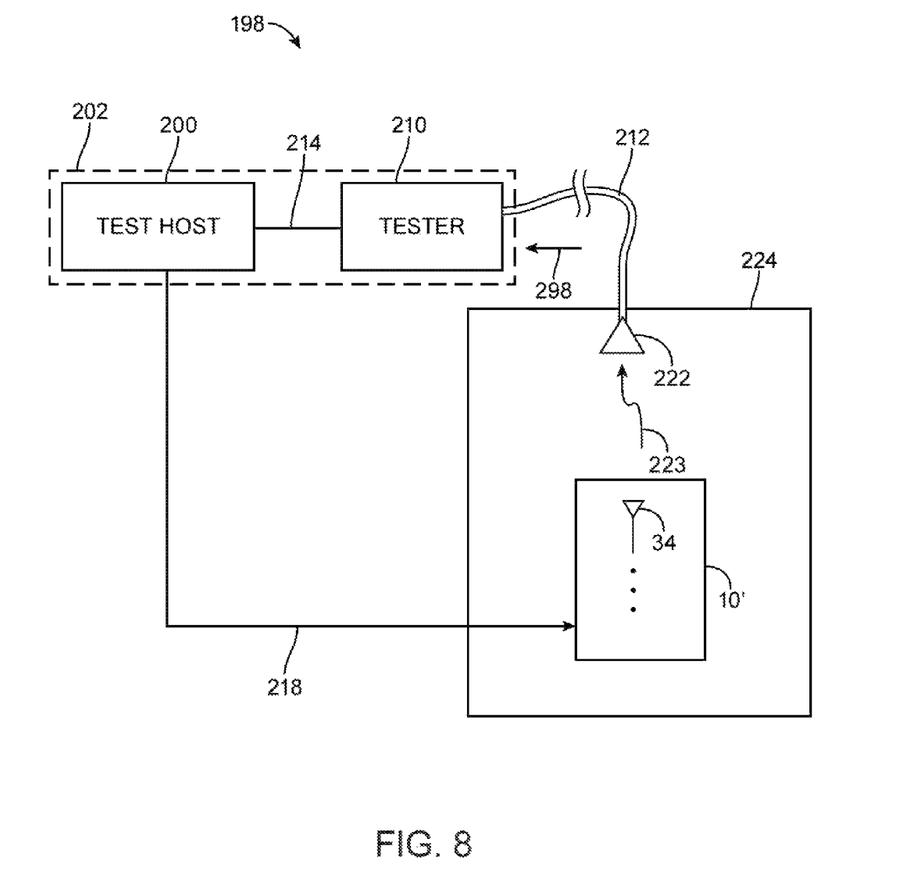
FIG. 8 is a diagram of an illustrative test system including test equipment for testing a wireless electronic device using a wireless connection in accordance with an embodiment of the present invention.

In another suitable arrangement, DUT 10' may be tested using an over-the-air test station such as test station 198 as shown in FIG. 8. Test station 198 may include test host 200, tester 210, and a test enclosure such as test enclosure 224. Test host 200 and tester 210 may optionally be formed together as test equipment 202. Test equipment 202 may be a computer, test station, or other suitable system that performs the functions of test host 200 and tester 202.

During testing, at least one DUT 10' may be placed within test enclosure 224. DUT 10' may be coupled to test host 200 via control cable 218 (e.g., a USB-based connection or a UART-based connection). Test host 200 may send control signals over path 218 to instruct DUT 10' to perform desired operations during testing.

Test enclosure 224 may be a shielded enclosure (e.g., a shielded test box) that can be used to provide radio-frequency isolation from the outside environment during testing. Test enclosure 224 may, for example, be a transverse electromagnetic (TEM) cell. The interior of test enclosure 224 may be lined with radio-frequency absorption material such as rubberized foam configured to minimize reflections of wireless signals. Test enclosure 224 may include wireless structures 222 in its interior for communicating with DUT 10' using wireless radio-frequency signals. Wireless structures 222 may sometimes be referred to herein as test antennas 222. During wireless testing, DUT 10' may transmit radio-frequency test signals to test antennas 222 over uplink path 223. As an example, wireless structures 222 may implement near field electromagnetic coupling with antennas 34 in DUT 10' (e.g., coupling over ten centimeters or less). Wireless structures 222 in test enclosure 220 may include an inductor or other near field communications element (sometimes referred to as a near field communications test antenna or a near field communications coupler) used to receive near field electromagnetic signals from antennas 34 in DUT 10'.

Test antenna 222 may be coupled to test unit 210 via radio-frequency cable 212 (e.g., a coaxial cable). Test antenna 222 may be used during design or production test procedures to perform over-the-air testing on DUT 10' (e.g., so that radio-frequency signals may be conveyed from DUT 10' to tester 210 via antenna 222 and cable 212). Test antenna 222 may, as an example, be a microstrip antenna such as a microstrip patch antenna. During testing, radio-frequency uplink signals (radio-frequency test signals) may be conveyed from DUT 10' to tester 210 via test antenna 222 and radio-frequency cable 212 in the direction of arrow 298.

Figure 9:
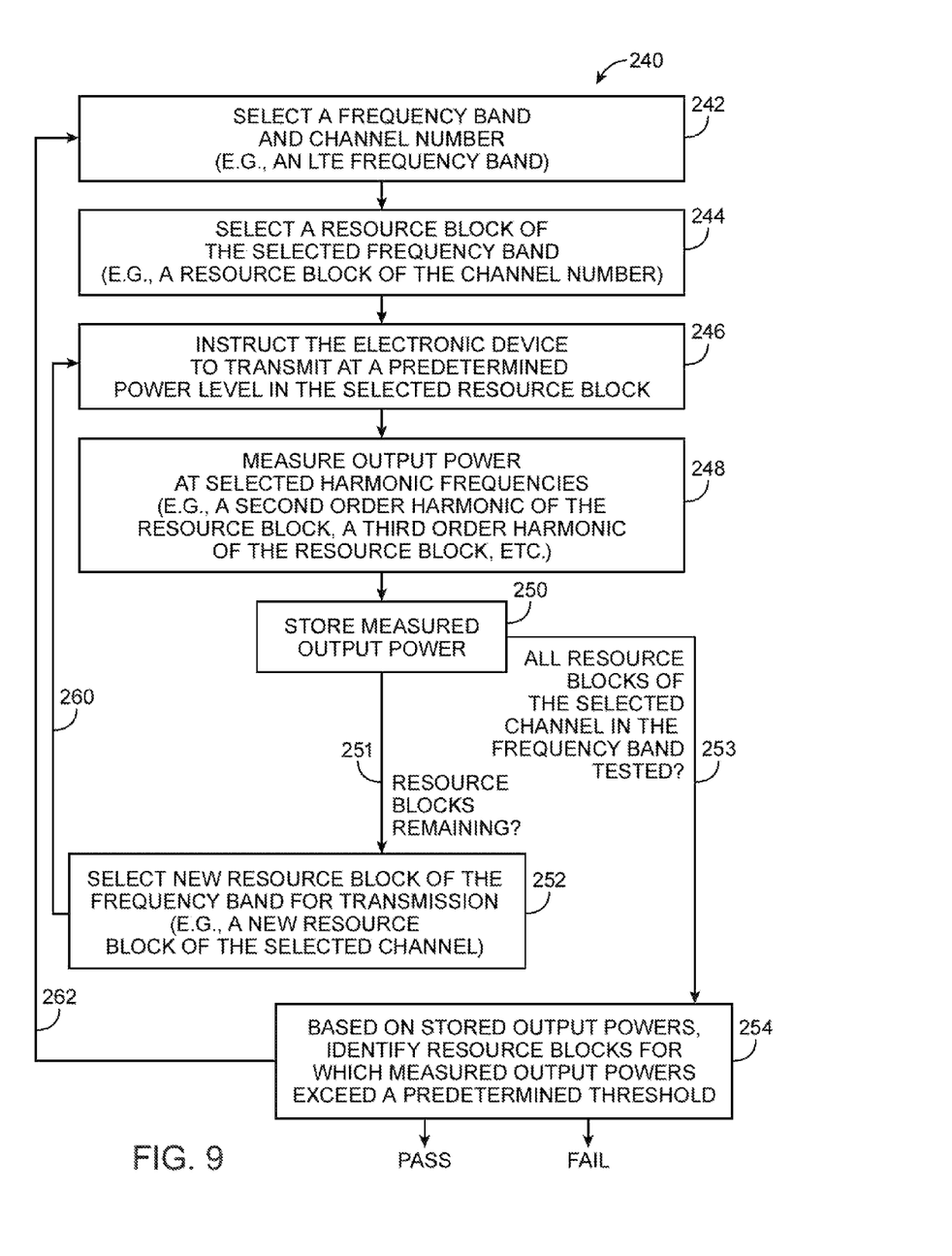
FIG. 9 is a flow chart of illustrative steps that may be performed by test equipment to characterize the radio-frequency performance of a device under test in accordance with an embodiment of the present invention.

FIG. 9 shows an a flow chart 240 of illustrative steps that may be performed by a test system such as test system 196 of FIG. 7 and test system 198 of FIG. 8 to test the radio-frequency performance of wireless communications circuitry 4 in device 10. The steps of flow chart 240 may be performed to identify wireless devices that produce excessive levels of harmonic signal power.

At step 242, test host 200 may select a frequency band for testing. The selected frequency band may be a communications band such as the cellular band between frequencies $F_0$ and $F_3$ as shown in FIG. 5. Test host 200 may select a channel identified by a channel number in the selected frequency band for testing. The selected cellular band may be an LTE band (e.g., LTE band 1, 2, 3, etc.). The selected LTE band may be partitioned into a number of available resource blocks (see, e.g., resource blocks 100 of FIGS. 3 and 4 that serve as basic scheduling units for LTE communications). The available resource blocks may each correspond to a respective set of frequency subcarriers and a respective time period (e.g., a set of consecutive OFDM symbols).

At step 244, test host 200 may select a resource block from the available resource blocks in the selected LTE band for testing. The resource block may be selected from any available resource block in the selected LTE band. The resource block may be selected from the selected channel in the selected LTE band. For example, test host 200 may select a first resource block 100 centered at frequency $F_C$ as shown in FIG. 5.

At step 246, test host 200 instructs DUT 10' to transmit radio-frequency test signals at a desired output power level in the selected resource block. For example, test host 200 may instruct DUT 10' to transmit radio-frequency test signals with an output power level $P_1$ in a resource block 100 centered about frequency $F_C$ as shown by curve 108 of FIG. 5. Non-linear operations of wireless communications circuitry 4 in DUT 10' may produce radio-frequency harmonic components in the transmitted radio-frequency test signals at one or more harmonic frequencies of the selected resource block. For example, the transmitted radio-frequency test signals may have harmonic output power at a second order harmonic frequency, at a third order harmonic frequency, etc.

At step 248, tester 210 measures the output power level of the radio-frequency test signals received from DUT 10' at one or more harmonic frequencies of the selected resource block (i.e., tester 210 measures the harmonic output power levels of the radio-frequency test signals received from DUT 10'). For example, tester 210 may measure harmonic output power levels of the received radio-frequency test signals at the second order harmonic frequency, at the third order harmonic frequency, and/or at the fourth order harmonic frequency of the selected resource block. If desired, tester 210 may also measure harmonic output power levels at even higher order harmonic frequencies (e.g., at an eighth order harmonic frequency, at a tenth order harmonic frequency, etc.). Tester 210 may measure the harmonic output power levels of the radio-frequency test signals received from DUT 10' at any desired number of harmonic frequencies of the selected resource block.

Tester 210 may perform multiple harmonic output power level measurements at harmonic frequencies of the selected resource block (e.g., tester 210 may perform one measurement at harmonic frequencies of the selected resource block, three measurements at harmonic frequencies of the selected resource block, etc.). Tester 210 may, if desired, identify harmonic frequencies of the selected resource block that are included in other communications bands used by DUT 10' (e.g., a Wi-Fi® band, GPS band, etc.). Tester 210 may measure harmonic output power levels at the identified harmonic frequencies.

At step 250, tester 210 may store the measured harmonic output power levels in storage circuitry (e.g., hard disk drive storage, nonvolatile memory, volatile memory, etc.). Alternatively, tester 210 may convey the harmonic output power levels to test host 200 for storage.

If resource blocks of the selected frequency band (e.g., resource blocks in the selected channel number of the frequency band) remain to be tested, processing may subsequently proceed to step 252 via path 251 to select a new resource block for testing. Processing may then loop back to step 246 via path 260 to test harmonic output power levels for the selected resource block.

If all desired resource blocks of the selected frequency band (e.g., resource blocks in the selected channel number of the frequency band) have been tested (e.g., processed during steps 246-250), processing may proceed to step 254 via path 253. During the operations of step 254, the stored harmonic output power level measurements (sometimes referred to herein as harmonic output power data) may be passed to test host 200. Test host 200 may compare the stored harmonic output power levels to predetermined harmonic output power level thresholds. In response to determining that the measured harmonic output power levels for one or more harmonic frequencies of the given resource block exceed corresponding harmonic output power level thresholds, test host 200 may determine that the device under test fails testing. Devices under test that fail testing may be scrapped or, if desired, may be reworked. Resource blocks corresponding to unacceptable harmonic output power levels may be flagged for later analysis. In response to determining that the measured harmonic output power levels each satisfy the corresponding output power level threshold, test host 200 may determine that the device under test passes testing.

If desired, DUT 10' may be identified as having insufficient radio-frequency performance if any desired number of measured harmonic output power levels (e.g., three or more harmonic output power levels, four or more harmonic output power levels, etc.) associated with any desired number of resource blocks exceed corresponding threshold power levels. For example, DUT 10' may be characterized as having insufficient radio-frequency performance if two or more harmonic output power levels in any resource blocks are identified during testing as exceeding corresponding threshold power levels. Determining whether DUT 10' passes or fails testing may sometimes be referred to as performing pass-fail operations.

As shown by path 262, processing may loop back to step 242 after the radio-frequency performance of DUT 10' has been characterized for the selected frequency band and channel number in the selected frequency band. Radio-frequency performance may be tested for other selected channels in the selected frequency band and/or in other selected frequency bands (e.g., in other LTE bands). In this way, the radio-frequency performance of DUT 10' may be tested for any desired number of different communications bands (e.g., in one or more LTE bands).

The steps shown in FIG. 9 are merely illustrative. If desired, the DUT 10' may be controlled by test host 200 to transmit radio-frequency test signals in any number and combination of resource blocks (e.g., DUT 10' may transmit radio-frequency test signals in two consecutive resource blocks, in three non-consecutive resource blocks etc.). Test operations may be performed on any subset of the available resource blocks in selected communications bands. In the scenario where test host 200 and tester 210 are formed together as test equipment 202, test equipment 202 may perform the steps of flow chart 240 to test the radio-frequency performance of DUT 10'. The operations of flow chart 240 may be used to characterize the radio-frequency performance of amplifier circuitry 20, radio-frequency front-end circuitry 28, or any other desired components in wireless communications circuitry 4 in device 10.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for testing a wireless electronic device using test equipment, the method comprising:

with the test equipment, configuring the wireless electronic device for communications in a frequency band that is partitioned into a plurality of resource blocks;

with the test equipment, instructing the wireless electronic device to transmit radio-frequency signals in a selected resource block of the plurality of resource blocks;

with the test equipment, measuring radio-frequency signal power transmitted by the wireless electronic device at selected harmonic frequencies of the selected resource block; and with the test equipment, determining whether the measured radio-frequency signal power transmitted by the wireless electronic device at the selected harmonic frequencies of the selected resource block exceeds a predetermined threshold.

2. The method defined in claim 1 wherein configuring the wireless electronic device for communications in the frequency band comprises configuring the wireless electronic device for communications in a channel number in the frequency band.

3. The method defined in claim 2 wherein the electronic device is operable to communicate in an additional frequency band simultaneously with communications in the channel number in the frequency band, the method further comprising:

with the test equipment, identifying harmonic frequencies of the selected resource block that are included in the additional frequency band, wherein measuring the radio-frequency signal power transmitted by the wireless electronic device at the selected harmonic frequencies of the selected resource block comprises:

measuring the radio-frequency signal power transmitted by the wireless electronic device at the identified harmonic frequencies that are included in the additional frequency band.

4. The method defined in claim 1, wherein the selected frequency band comprises a Long Term Evolution frequency band and wherein configuring the wireless electronic device for communications in the frequency band comprises:

configuring the wireless electronic device for communications in the Long Term Evolution frequency band.

5. The method defined in claim 4, further comprising:

with the test equipment, instructing the wireless electronic device to transmit radio-frequency signals in an additional resource block of the plurality of resource blocks; and with the test equipment, measuring radio-frequency signal power levels transmitted by the wireless electronic device at selected harmonic frequencies of the additional resource block.

6. The method defined in claim 5, wherein instructing the wireless electronic device to transmit the radio-frequency signals in the selected resource block comprises instructing the wireless electronic device to transmit the radio-frequency signals in the selected resource block during a first time period and wherein instructing the wireless electronic device to transmit the radio-frequency signals in the additional resource block comprises instructing the wireless electronic device to transmit the radio-frequency signals in the additional resource block during a second time period subsequent to the first time period.

7. The method defined in claim 5, further comprising:

storing data that identifies the measured radio-frequency signal power at the selected harmonic frequencies of the selected resource block and the additional resource block.

8. The method defined in claim 7, further comprising:

based on the stored data, determining whether the measured radio-frequency signal power levels at the selected harmonic frequencies of the selected resource block exceed the predetermined threshold.

9. The method defined in claim 8, further comprising:

based on the stored data, determining whether the measured radio-frequency signal power at the selected harmonic frequencies of the additional resource block exceeds an additional predetermined threshold.

10. The method defined in claim 7 wherein the selected harmonic frequencies of the selected resource block include first and second harmonic frequencies of the selected resource block, the method further comprising:

based on the stored data, determining whether the measured radio-frequency signal power level at the second harmonic frequency exceeds a first predetermined threshold; and based on the stored data, determining whether the measured radio-frequency signal power level at the third harmonic frequency exceeds a second predetermined threshold.

11. The method defined in claim 4, further comprising:

with the test equipment, providing a plurality of instructions to the wireless electronic device, wherein each instruction of the plurality of instructions directs the wireless electronic device to transmit radio-frequency signals in a respective resource block of the plurality of resource blocks; and with the test equipment, measuring radio-frequency signal power levels transmitted by the wireless electronic device at selected harmonic frequencies of each resource block of the plurality of instructions.

12. The method defined in claim 11 further comprising:

in response to determining that the measured radio-frequency signal power levels exceed the predetermined threshold power level, identifying which resource blocks of the plurality of instructions have measured radio-frequency signal power levels that exceed the predetermined threshold power level.

13. The method defined in claim 1, wherein the selected harmonic frequencies of the selected resource block includes a second order harmonic frequency of the selected resource block.

14. The method defined in claim 1, wherein the selected harmonic frequencies of the selected resource block includes a third order harmonic frequency of the selected resource block.

15. A method for testing wireless communications circuitry using test equipment, wherein the wireless communications circuitry is operable to transmit radio-frequency signals in a communications band partitioned into a plurality of resource blocks, the method comprising:

instructing the wireless communications circuitry to transmit radio-frequency signals in a selected resource block of the communications band;

measuring the transmitted radio-frequency signals from the wireless communications circuitry; and performing pass-fail operations on the wireless communications circuitry at harmonic frequencies of the selected resource block based on the measured radio-frequency signals, wherein measuring the transmitted radio-frequency signals from the wireless communications circuitry comprises measuring radio-frequency power levels produced by the wireless communications circuitry at the harmonic frequencies of the selected resource block.

16. The method defined in claim 15 wherein performing the pass-fail operations on the wireless communications circuitry at the harmonic frequencies of the selected resource block based on the measured radio-frequency signals comprises:

determining whether the radio-frequency power levels produced by the wireless communications circuitry at the harmonic frequencies of the selected resource block exceed a predetermined threshold power level; and     in response to determining that the radio-frequency power levels produced by the wireless communications circuitry at the harmonic frequencies of the selected resource block exceed the predetermined threshold power level, notifying a user that the wireless communications circuitry fails testing.

17. The method defined in claim 16 wherein each resource block of the plurality of resource blocks corresponds to a respective set of frequency subcarriers and a respective time period, wherein measuring the radio-frequency power levels produced by the wireless communications circuitry at the harmonic frequencies of the selected resource block comprises:

measuring the radio-frequency power levels produced by the wireless communications circuitry at harmonic frequencies of the set of frequency subcarriers.

18. Test equipment for testing a wireless electronic device, wherein the wireless electronic device is operable to communicate using a frequency band that is partitioned into a plurality of resource blocks, the test equipment comprising:

a test host configured to instruct the wireless electronic device to transmit radio-frequency signals in a selected resource block of the plurality of resource blocks; and     a tester configured to measure radio-frequency signal power levels produced by the electronic device at selected harmonic frequencies of the selected resource block and to provide the measured radio-frequency signal power levels to the test host, wherein the test host is configured to perform pass-fail test operations by determining whether the radio-frequency signal power levels exceed predetermined threshold power levels.

19. The test equipment defined in claim 18, wherein the wireless electronic device is operable to communicate using a channel number in the frequency band and wherein the test host is further configured to instruct the wireless electronic device to transmit radio-frequency signals in a selected resource block in the channel number in the frequency band.

20. The test equipment defined in claim 18 wherein the tester includes an antenna operable to wirelessly receive the radio-frequency signals transmitted by the wireless electronic device.

21. The test equipment defined in claim 18 wherein the tester includes a connector operable to receive the radio-frequency signals transmitted by the wireless electronic device over a radio-frequency cable.

* * * * *